United States Patent [19]
Kirschner et al.

[11] 3,829,119
[45] Aug. 13, 1974

[54] APPARATUS FOR STATIC LEVEL REGULATION OF A VEHICLE

[75] Inventors: Peter Kirschner; Heinz Gunter Rauer, both of Wolfsburg, Germany

[73] Assignee: Volkswagenwerk Aktiengesellschaft, Wolfsburg, Germany

[22] Filed: Aug. 30, 1972

[21] Appl. No.: 285,082

[30] Foreign Application Priority Data
Sept. 18, 1971 Germany............................ 2146723

[52] U.S. Cl. ......... 280/124 F, 267/DIG. 1, 280/6 H
[51] Int. Cl. ........................................... B60g 17/00
[58] Field of Search ............ 267/DIG. 1, 60; 280/6, 280/6 H, 124 R, 124 F

[56] References Cited
UNITED STATES PATENTS

| | | | |
|---|---|---|---|
| 2,625,388 | 1/1953 | Herreshoff..................... | 267/DIG. 1 |
| 2,998,970 | 9/1961 | Davis............................ | 267/DIG. 1 |
| 3,332,677 | 7/1967 | Long............................. | 267/DIG. 1 |

Primary Examiner—Philip Goodman
Attorney, Agent, or Firm—Brumbaugh, Graves, Donohue & Raymond

[57] ABSTRACT

The static level of vehicles having a spring arrangement between the body and axle is regulated by controlling a threaded adjustment device in a manner that, despite variations in the compression of the spring arrangement due to static loading of the vehicle, the distance between the axle and the body of the vehicle remains constant. A threaded shaft mates with a threaded receiving part, one being rotatable and mounted on a part of the vehicle while the other is non-rotatable and mounted to contact an end of the spring arrangement. Rotating motion is imparted to the rotatable part in response to static load variations which causes a variation in the relative positions of the threaded receiving part and the threaded shaft in a self-locking manner thereby maintaining the distance between the axle and the body of the vehicle constant.

10 Claims, 4 Drawing Figures

APPARATUS FOR STATIC LEVEL REGULATION OF A VEHICLE

BACKGROUND OF THE INVENTION

This invention relates to an apparatus for regulating the level of a vehicle and, in particular, to an apparatus for regulation of the static level of a vehicle body with respect to the axle when the vehicle is not moving.

Apparatus for dynamic regulation of the level of vehicles, wherein rapid changes in the inclination of the vehicle due to such factors as unevenness of the road and the like, are generally well known. However, they are not effective in regulating the level of vehicles in response to factors like changes occurring in the inclination of the vehicle or in the distance of the body from the road when the vehicle is not in motion. If not compensated for, these factors may cause dangerous driving conditions and result in discomfort for passengers in the vehicle.

Apparatus for static level regulation of vehicles are known that have utilized hydraulic or pneumatic control systems. These systems, however, are rendered ineffective whenever a leak occurs to cause loss of pressure to either the liquid or gas.

SUMMARY OF THE INVENTION

There is provided in accordance with the present invention an apparatus for regulation of the static level of a vehicle that does not utilize hydraulic or pneumatic control systems and is therefore not susceptible to operational failures due to pressure losses in the control system. More particularly, the regulation of the static load level of the vehicle is accomplished through a mechanical adjustment device.

In an apparatus for static load level regulation of the type with which the invention is concerned, a vehicle normally has a spring arrangement mounted between the vehicle body and axle. A self-locking, threaded adjustment device is mounted between one end of the spring arrangement and a member of the vehicle comprising either the body or the axle, and varies the distance between the member and the spring end adjacent the adjustment device to compensate for variations in the distance between the end of the spring adjacent the adjustment device and the other member of the vehicle to thereby maintain the distance between the body and the axle constant.

The threaded adjustment device comprises two elements: a threaded shaft and a threaded receiving part, one of which elements is prevented from rotating while the other is rotatable and connected to a driving control to cause it to rotate in response to load variations. The rotatable element is mounted on the vehicle member (body or axle) while the non-rotating element is rigidly connected to an end of the spring arrangement. In one type of spring arrangement, wherein the spring is helical and wherein a shock absorber having a cylinder, piston, and piston rod is mounted together with thrust bearings within the spring with the thrust bearings in contact with the ends of the spring, the non-rotating element of the adjustment device is rigidly connected to one of the thrust bearings while the rotating element is mounted on the vehicle member.

In one form of the invention the threaded shaft is a part of the end of the piston rod with one thrust bearing being mounted on the piston rod. The threaded receiving part which comprises a nut is rotatable and is integral with the body with the inclusion of ball bearings to allow rotation of the nut while supporting the body. Thus, the nut and the body move in relation to the threaded shaft in response to the rotation of the nut by the driving control.

In another form of the invention the threaded receiving part forms a non-rotatable threaded plate which is integral with a thrust bearing. The threaded shaft forms a part of the piston rod, the shaft being mounted on the body through a bearing assembly and connected to the rotating drive. Additional apparatus are included to protect the threaded shaft and plate from contact with undesirable debris that would otherwise interfere with the operation of the self-locking threads, to limit the maximum displacement of the protection plate relative to the piston rod and to assist the shock absorber in absorbing dynamic load variations.

The threads of the shaft and receiving part have a self-locking feature so that their relative positions vary only in response to the drive control. The adjustment device does not alter its position of adjustment unless further variations sensed by the drive control command it to change its position.

The drive control comprises a detecting circuit to detect a load variation, a switch operated by the detecting circuit, a motor driven by the switch and a gear assembly to translate the motor output to the rotating element. The detecting element may comprise a resistance bridge network wherein the variable resistor is controlled by the position of the body in respect to either one or two axles.

The apparatus for static load regulation is compatible with a vehicle having any type of spring arrangement. Furthermore, the apparatus may not only be positioned between the body of the vehicle and one end of the spring, but also may be mounted between the axle and the other end of the spring. Additionally, the apparatus may be semi-automatic rather than automatic by replacing the detecting circuit with a manual switch control that may be operated by the driver of the vehicle.

BRIEF DESCRIPTION OF THE DRAWINGS

For a better understanding of the invention, reference may be made to the following descriptions of exemplary embodiments taken in conjunction with the following drawings in which.

DESCRIPTION OF PREFERRED EMBODIMENTS

Figure 1:
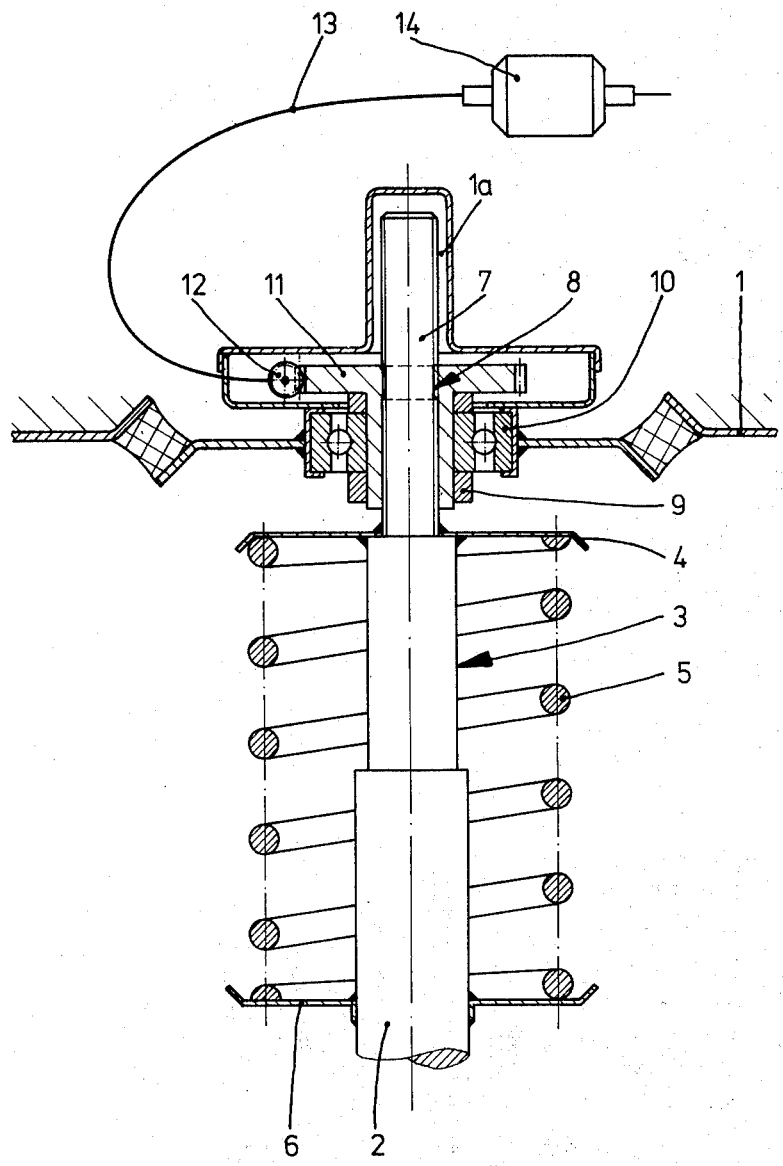
FIG. 1 is a schematic diagram of one embodiment of an apparatus for static load regulation of a vehicle.

In a illustrative embodiment of an apparatus for static level regulation of a vehicle according to the present invention, as shown in FIG. 1, a vehicle body, represented generally by the numeral 1, has a shock absorber assembly positioned thereunder, the other end of the shock absorber being mounted on a vehicle axle (not shown). The shock absorber comprises a cylinder 2 (shown partially) that is rigidly connected to the axle, a piston rod 3 connected to a piston (not shown) positioned within the cylinder 2, a thrust bearing 4 mounted on the piston rod 3, a helical compression spring 5, and a thrust bearing 6 mounted on the cylinder 3. As variations in the relative positions of the piston within cylinder 2 occur, stress is exerted on the spring 5, situated between the thrust bearings 4 and 6 due to the variations in distance between them. With conventional shock absorbers, which are used primarily to dampen dynamic shock variations caused by rapid changes in the distance between the axle and the body 1, the piston rod 3 is rigidly mounted to the body 1. However, in the present embodiment which provides the capability of regulating the static load level of the vehicle the piston rod 3 is connected to the body 1 in a manner described below.

The upper end of the piston rod 3 has mounted thereon a shaft 7 with self-locking threads. The threaded shaft 7 is shown with a smaller diameter than the piston rod 3 and the threads start at the top of the shaft 7 and may extend to the juncture of the shaft 7 with the piston rod 3. A threaded nut 8 (shown partially with broken lines) has self-locking threads that engage the threads of the shaft 7. The load of the vehicle body 1 is transmitted to the nut 8 through a support member 9, a ball bearing assembly 10 and a gear wheel 11. The gear wheel 11 has gears (shown partially) around the circumference that engage the gears of a worm gear 12 that is driven by a flexible shaft 13 adapted for rotation by an electric motor 14. Control of the motor 14 is from a detecting circuit to be described below.

In operation, a tendency for the distance between the body 1 and the axle to vary due to a variation in the distance between the thrust bearings 4 and 6 caused by static load variations is offset by a compensating variation in the distance between the body 1 and the thrust bearing 4, thereby maintaining the displacement between the axle and the body 1 constant. This is accomplished by altering the relative position of the threaded nut 8 to the threaded shaft 7 by rotating the nut 8 and preventing the threaded shaft 7 from rotating. The threaded shaft 7 does not rotate because the cylinder 2 is rigidly mounted on the axle and the frictional resistance between the spring 5 and the thrust bearing 6, connected to the cylinder 2, and the thrust bearing 4, connected to the piston rod 3, is too large to be overcome by the tendency for the shaft 7 to rotate in response to rotations of the nut 8. The motor 14, which may be the size of a standard windshield wiper motor, is capable of imparting rotation to the supporting nut 8, despite the fact that the nut supports the load of the body 1, due to the ball bearing assembly 10.

Thus, for example, if the load of the vehicle should increase thereby lowering the body 1, the motor 14 would cause the nut 8 to rotate in a manner causing the distance between the thrust bearing 4 and the body 1 to increase thereby maintaining the level of the body 1 constant. In opposite manner, a decrease in the load is offset by causing the top of the threaded shaft 1 to come closer to the top of a cup-shaped member 1a of the body 1.

Figure 2:
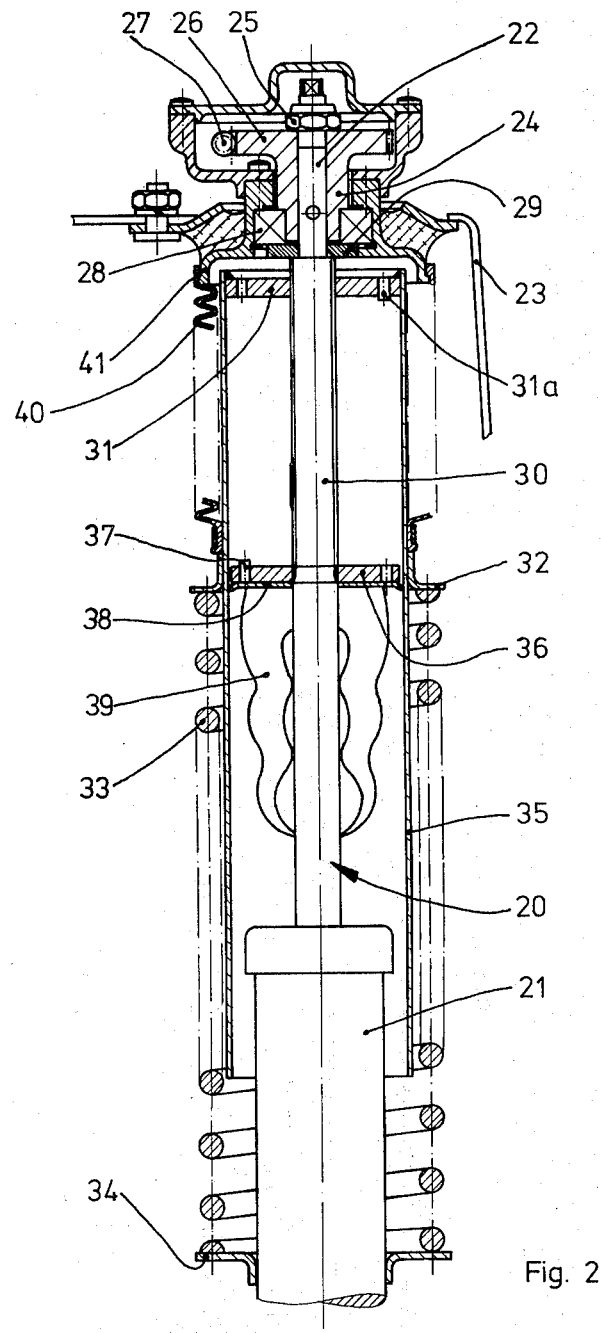
FIG. 2 is a schematic diagram of another embodiment of an apparatus for static load regulation of a vehicle.

Referring now to FIG. 2, a piston rod 20, mounted on a piston (not shown), engages a cylinder 21 (shown partially) whose lower end is rigidly mounted on the axle (not shown). The piston rod 20 may be rotated with respect to the vehicle body 23, shown as a portion of a wheel housing, by means of an upper end portion 22, shown with a smaller cross-sectional area than that of the piston rod 20, a support member 24 and a nut 25. The support member 24 surrounds the upper end 22 and is rigidly mounted to the upper end 22 to rotate with it. The nut 25, while not impeding any rotation of the upper end 22 relative to the vehicle body 23, does prevent any translational motion of the upper end 22 relative to the body 23. A gear wheel 26, rather than translating rotary motion to the support nut 8 in the embodiment in FIG. 1, is rigidly mounted to the upper end 22 and therefore imparts rotation to the upper end 22 and the support member 24. A worm gear 27, activated by the electric motor shown in FIG. 1, engages the gears on the circumference of the gear wheel 26 to cause it to rotate. To minimize the otherwise severe frictional forces that would be present in attempting to rotate the upper end 22 relative to the body 23 while the upper end supports the load of the body 23, a ball bearing assembly 28 is mounted generally between the support member 24 and the vehicle body 23. A disc 29 mounted on the body generally provides support for the shock absorber.

Intermediate the piston rod 20 and the upper end 22 is a threaded section 30, which threads are self-locking and engage the self-locking threads of a plate 31 that is rigidly connected to an upper thrust bearing 32. The bearing 32 provides an upper mount for a helical compression spring 33; a lower mount is formed by a lower thrust bearing 34 which is rigidly connected to the cylinder 21. Interconnecting the plate 31 and the bearing 32 is a protective tube 35, which may be welded or threaded, as desired. The protective tube 35 extends downward to surround the upper portion of the cylinder 21. A stop plate 36 is enclosed within the tube 35 and is rigidly mounted on the threaded section 30. Thus, as the section 30 rotates, the plate 36 rotates. A stop pin 37 on the plate 36 and a stop pin 31a on the plate 31 serve to limit the maximum displacement of the section 30 relative to the plate 31 and thus of the thrust bearing 32, because the two plates become close enough together so that the stop pins engage receiving holes on the opposite plate. A seal 38 mounted on the inner wall of the tube 35 forms a barrier between the ends of the tube 35. A bumper 39 which may consist of a type of elastic material is placed in the region between the seal 38 and the cylinder 21 to further enhance the shock absorbing effect due to dynamic stress. Finally, a sleeve 40 (shown partially) surrounds the section 30 and is mounted on a flange which is in turn mounted on the disc 29 of the vehicle body 23. The primary purpose of the combination of the tube 35, seal 38 and sleeve 40 is to shield the self-locking threads from debris that otherwise might interfere with the operation of the plate 31 and the section 30.

In operation, the embodiment of FIG. 2 is similar to that previously described in reference to FIG. 1 in the sense that a change in the length between the two thrust bearings caused by variations in the static load level of the vehicle is counteracted by an oppositely directed change in the length between the upper thrust bearing 32 and the vehicle body 23 thereby maintaining constant the length between the lower thrust bearing 34 and the vehicle body 23. However, the manner of accomplishing this level regulation varies from that of the embodiment in FIG. 1. The threaded engagement between the section 30 and the plate 31 causes relative motion between them along the axis of the piston rod 20 but it is section 30 that undergoes rotating motion rather than the nut 8 in FIG. 1. The gear wheel 26 causes the upper end 22 to rotate while the plate 31 is secured against rotation by its frictional contact with the spring 33 through the tube 35 and thrust bearing 32. Thus, for example, if the load of the vehicle increases, the gear wheel 26 rotates the upper end 22 in a manner that the position of the plate 31 relative to the section 30 moves downwardly thereby maintaining the level of the body 23 constant.

Figure 3:
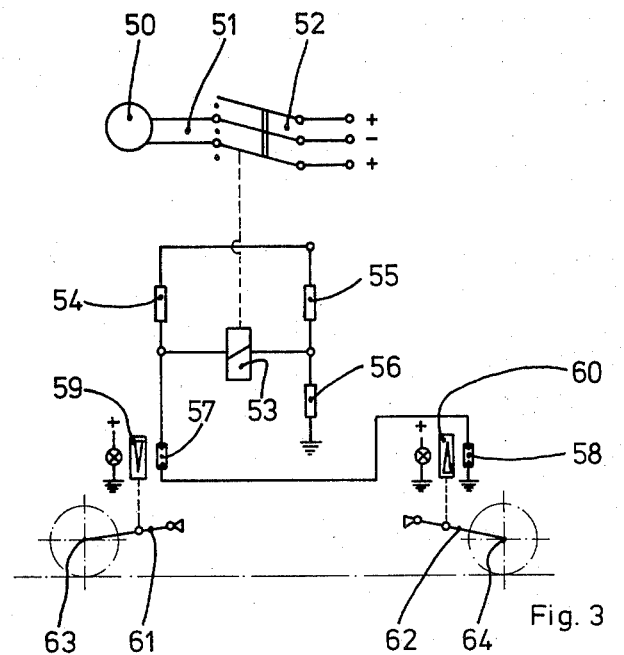
FIG. 3 is a schematic diagram of a drive control for the apparatus shown in FIG. 1 and FIG. 2.

In the embodiment of the drive control, shown in FIG. 3, the motor, referenced previously in FIG. 1, is represented by the numeral 50. Electrical power is supplied to the motor 50, which is polarity responsive, by a pair of conductors 51 that connect to contacts 52 of a polarized relay 53. There are three operational modes for the relay 53, one being with the relay unenergized with the contacts 52 not connecting the conductors 51 with any electrical power, the second with the relay energized, as shown in FIG. 3, with the negative polarity connected to the upper of the conductors 51 and, thirdly, with the relay energized with positive polarity on the upper of the conductors 51. Thus, the motor 50 is either not driven at all or driven in one of two directions depending on the state of energization of the relay 53. The relay 53 is controlled by a resistance bridge network with four terminals made up by fixed value resistors 54, 55, and 56 and the combination of a pair of light sensitive resistors 57 and 58 connected in series. One terminal, defined as the junction of resistors 54 and 55 is connected to a source of DC power which may be supplied from a terminal of a vehicle battery (not shown) while the opposite terminal, the junction of resistors 56 and 58 is connected to chassis ground which also is usually connected to another terminal of the vehicle battery. The relay 53 is then connected across the other two terminals of the resistance bridge network. A pair of light filtering elements, such as wedge filters 59 and 60, are positioned approximately between a pair of light sources and the resistors 57 and 58, respectively. The filters 59 and 60 are mechanically coupled to a pair of arms 61 and 62 that are mounted on a pair of vehicle axles 63 and 64, respectively. The purpose of the pair of resistors 57 and 58 with their respective control elements on each of the two axles of the vehicle is to maintain the inclination of the vehicle body a constant distance from both axles (rather than just one axle). Thus, regardless of the loading of the vehicle, the inclination of the vehicle relative to the plane formed by the two axles will remain constant when the vehicle is not in motion.

In operation, where the level of the vehicle inclination is proper, the combined resistance of the resistors 57 and 58 is such that there is insufficient voltage across the relay 53 to energize it so that the motor 50 will not receive power. The light sources are mounted on the vehicle body and when, due to loading, their positions change relative to the wedge filters 59 and 60, a varying amount of light passes through the filters thereby changing the value of the respective resistors. A net increase in the value of resistors 57 and 58 energizes relay 53 to provide one polarity of electrical power to the motor while a net decrease energizes the relay so that the other polarity is applied to the motor. In this manner the motor 50 responds to either of two drive directions.

Figure 4:
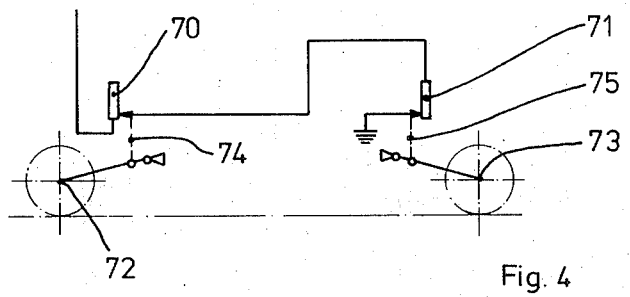
FIG. 4 is a schematic diagram of another drive control for the apparatus shown in FIG. 1 and FIG. 2.

Another type of drive control is shown in FIG. 4 where instead of the light sensitive resistors 57 and 58 of FIG. 3, a pair of potentiometers 70 and 71 are connected to the resistance bridge network. The two axles, herein given the numerals 72 and 73, serve as the base upon which a pair of wiper arms 74 and 75 for the resistors 70 and 71, respectively, are mounted. The potentiometers 70 and 71 are mounted on the vehicle body in such a manner that when the body moves, there is a variation in resistance of the potentiometers due to the relative movement between the potentiometers and the wiper arms.

Several modifications of the embodiments previously described are contemplated within the scope of the invention. For example, static level regulation need not be carried out automatically but may be performed semi-automatically in that the driver may manually operate a switch which may be used instead of the detecting circuit. Since it may be more desirable to have the apparatus operative only when the vehicle is not in motion, an interlock, controlled by closing the vehicle doors and/or the hood, may be used to prevent the motor from driving when the vehicle is in motion. Also, the invention is compatible with spring arrangements where shock absorbers are separated from the springs, where there are no shock absorbers, or where springs other than the helical compression type are utilized.

The embodiments of the present invention described previously are intended to be merely exemplary and those skilled in the art will be able to make numerous variations and modifications without departing from the spirit of the present invention. All such variations and modifications are intended to be within the scope of the invention as defined in the appended claims.

We claim:

1. Apparatus for static level regulation of a vehicle having a body, an axle, spring means arranged between the body and the axle, and shock absorber means including a cylinder, a piston positioned within the cylinder, a piston rod mounted on the piston, and two thrust bearings, a different one of the two thrust bearings being mounted on the piston rod adjacent one end of the spring means and on the cylinder adjacent the other end of the spring means, respectively, said apparatus comprising:
   a. screw means including a threaded shaft that is formed as a part of the end of the piston rod away from the piston and threaded receiving means arranged to engage the threaded shaft so that a relative rotation between the threaded receiving means and the threaded shaft causes a relative displacement of the threaded receiving means along the length of the threaded shaft, said screw means being self-locking;
   b. means for supporting the threaded receiving means disposed between the threaded receiving means and one of the body and the axle; and
   c. driving means engaging the threaded receiving means and including
      i. detecting means to sense a variation in loading of the vehicle and to provide an output representative of the variation, and
      ii. motor means receiving the output and translating it into rotating motion of the threaded receiving means so that a change in distance between the body and the one of the two thrust bearings disposed closer to the axle due to variations in vehicle load is accompanied by an oppositely directed compensating change in distance between the one of the two thrust bearings disposed closer to the screw means and the one of the body and the axle adjacent said one of the two thrust bearings closer to the screw means.

2. Apparatus according to claim 1 wherein the supporting means includes means for reducing friction during rotation of the threaded receiving means.

3. Apparatus according to claim 1 wherein the motor means includes a motor and gear means comprising a flexible rotating shaft connected at one end to said motor, a worm gear connected to the other end of said flexible rotating shaft and a gear wheel engaging said worm gear and being rigidly connected with the threaded receiving means.

4. Apparatus according to claim 1 wherein the motor means includes a motor and said detecting means comprises switch means to control said motor, resistance bridge means including a variable resistance means to control said switch means and sensing means adapted to alter the value of said variable resistance means in response to variations in the distance between said body and said axle.

5. Apparatus according to claim 4 wherein said variable resistance means comprises at least one radiation-sensitive resistor.

6. Apparatus according to claim 5 wherein said sensing means comprises a radiation source mounted on said body, a radiation filter mounted on said axle and positioned between said radiation source and said radiation-sensitive resistor to control the amount of light to said radiation-sensitive resistor.

7. Apparatus according to claim 4 wherein said variable resistance means comprises at least one potentiometer.

8. Apparatus according to claim 7 wherein said sensing means comprises an arm rigid with said axle and connected to a wiper arm on said potentiometer mounted on said body to vary the resistance in accordance with the distance between said body and said axle.

9. Apparatus according to claim 6 wherein said sensing means is associated with each of two said axles and wherein two radiation-sensitive resistors are connected in series to control said motor in response to the difference in distance between said body and each of said axles.

10. Apparatus according to claim 8 wherein said sensing means is associated with each of two said axles and wherein two potentiometers are connected in series to control said motor in response to the difference in distance between said body and each of said axles.

* * * * *